United States Patent
Wang et al.

(10) Patent No.: US 7,639,912 B2
(45) Date of Patent: Dec. 29, 2009

(54) APPARATUS AND METHOD FOR SUBTERRANEAN DISTRIBUTION OF OPTICAL SIGNALS

(75) Inventors: Shih-Yuan Wang, Palo Alto, CA (US); Raymond G. Beausoleil, Redmond, CA (US); Wei Wu, Mountain View, CA (US); Sean M. Spillane, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/701,159

(22) Filed: Jan. 31, 2007

(65) Prior Publication Data

US 2008/0181557 A1 Jul. 31, 2008

(51) Int. Cl.
*G02B 6/26* (2006.01)
(52) U.S. Cl. .......................... 385/39; 385/14; 385/27; 385/28
(58) Field of Classification Search .......... 385/14, 385/27, 31, 39
See application file for complete search history.

(56) References Cited

U.S. PATENT DOCUMENTS

| | | | |
|---|---|---|---|
| 5,200,631 A * | 4/1993 | Austin et al. | 257/570 |
| 5,652,811 A * | 7/1997 | Cook et al. | 385/14 |
| 5,786,925 A * | 7/1998 | Goossen et al. | 359/245 |
| 6,229,712 B1 * | 5/2001 | Munoz-Bustamante et al. | 361/783 |
| 6,410,941 B1 | 6/2002 | Taylor et al. | |
| 6,477,285 B1 | 11/2002 | Shanley | |
| 6,583,445 B1 | 6/2003 | Reedy et al. | |
| 6,630,713 B2 | 10/2003 | Geusic | |
| 6,813,418 B1 | 11/2004 | Kragl | |
| 6,872,983 B2 | 3/2005 | Liu | |
| 6,906,351 B2 | 6/2005 | Kryliouk et al. | |
| 6,916,717 B2 | 7/2005 | Li et al. | |
| 7,092,603 B2 * | 8/2006 | Glebov et al. | 385/51 |
| 7,136,551 B2 * | 11/2006 | Cho et al. | 385/31 |
| 7,149,385 B2 * | 12/2006 | Parikka et al. | 385/37 |
| 7,212,713 B2 * | 5/2007 | Fukuzawa et al. | 385/50 |
| 7,251,389 B2 * | 7/2007 | Lu et al. | 385/14 |
| 7,333,682 B2 * | 2/2008 | Kobayashi et al. | 385/14 |
| 7,373,033 B2 * | 5/2008 | Lu et al. | 385/14 |
| 2005/0094942 A1 | 5/2005 | Feuer et al. | |

OTHER PUBLICATIONS

Fiengold, Aviram, Very Large Scale Electro-Optical Device Process and Yield Challenges, CS ManTech, 2004, 4 pages, http://www.csmantech.org/Digests/2004/2004Papers/10B.1.pdf.

(Continued)

*Primary Examiner*—Frank G Font
*Assistant Examiner*—Eric Wong

(57) ABSTRACT

Systems and methods for subterranean distribution of optical signals on integrated circuits are disclosed. A semiconductor device comprising a multi-layer substrate includes a surface layer and a subterranean layer. Electrical devices are formed in the surface layer. Optoelectronic devices may be formed in the subterranean layer or the surface layer and configured for converting electrical signals to optical signals or converting optical signals to electrical signals. At least one optical waveguide is formed in the subterranean layer and configured for transmitting optical signals through the subterranean layer. Electrical vias may be included for coupling electrical signals between the subterranean layer and the surface layer. In addition, optical vias may be for coupling optical signals between the subterranean layer and the surface layer.

20 Claims, 4 Drawing Sheets

OTHER PUBLICATIONS

Georgakilas, A., et al., Wafer-Scale Integration of GaAs Optoelectronic Devices with Standard Si Integrated Circuits Using a Low-Temperature Bonding Procedure, Applied Physics Letters, Dec. 30, 2002, pp. 1-3, vol. 81, No. 27.

Hornak, L.A., et al., Merging Optics with Microelectronic Systems: Compatibility of GaAs Hereroepitaxy with Submicron Si CMOS, 1992 Annual Meeting IEEE Laser and ElectroOptic Society (LEOS) 438 (Boston, MA Nov. 16-19, 1992), 2 pages.

Kopperschmidt, P., et al., Interface Defects in Integrated Hybrid Semiconductors by Wafer Bonding, Physica B, 2001, pp. 1205-1208, vols. 308-310.

Neudeck, Philip G., et al., Characterization of 3C-SiC Films Grown on 4H- and 6H-SiC Substrate Mesas During Step-Free Surface Heteroepitaxy, Materials Science Forum, 2003, pp. 213-216, vols. 433-436.

Schmidt, Martin A., Wafer-to-Wafer Bonding for Microstructure Formation, Proceedings of the IEEE, Aug. 1998, pp. 1575-1585, vol. 86, No. 8.

Tong, Qin-Yi, et al., Wafer Bonding and Layer Splitting for Microsystems, Advanced Materials, 1999, pp. 1409-1425, vol. 11, No. 17.

* cited by examiner

APPARATUS AND METHOD FOR SUBTERRANEAN DISTRIBUTION OF OPTICAL SIGNALS

FIELD OF THE INVENTION

The present invention relates to signal distribution on integrated circuits. More particularly, the invention relates to subterranean distribution of optical signals on integrated circuits including electronic semiconductor devices.

BACKGROUND OF THE INVENTION

Integrated circuit fabrication advances have created a continual improvement in the density and speed of integrated circuits. Recently, metallic interconnection of electrical signals on integrated circuits has become problematic for propagating high speed signals over the relatively long distances of a semiconductor device.

Long signal runs and large fan-outs on some signals create propagation delays that approach, or even exceed the frequency of the signals. As an example, clock signals must be distributed across long distances and drive a large number of devices and buffers. To manage the loading and propagation delays of these clock signals elaborate clock trees with carefully balanced loads are often required to ensure that the clock signal edges have minimal skew at the clocked devices. Similar problems develop for data and control busses that must traverse long distances, have high fan-out requirements, or combinations thereof.

In other technological areas, optical signal routing and signal manipulation has become more prevalent with the advent of high bandwidth communication technologies. Naturally, to accommodate the optical signals, while still allowing processing of electrical signals, a large number of electrical-to-optical converters and optical-to-electrical converters have been developed.

Recently, semiconductor devices have been proposed that combine optical devices with conventional large scale bipolar and Complementary Metal Oxide Semiconductor (CMOS) devices. In addition, some proposals have been made to route optical signals over the top of conventional bipolar and CMOS electrical devices, thereby distributing optical signals to various regions of a semiconductor device.

However, fabricating optical devices or optical waveguides in layers above the semiconductor devices may have undesired effects. For example, the fabrication steps required to develop the optical layers may affect the device characteristics of already fabricated electrical devices below the optical layers. In addition, fabrication process limitation may require relatively thin optical layers, such that optical signals may interfere with electrical signal and electrical device operation on lower layers. Similarly, the electrical signals may interfere with propagation and generation of optical signals in the optical layers above the electrical signals and electrical devices.

Accordingly, there is a need for new signal routing technologies to distribute signals with minimal skew across long expanses of a semiconductor die and also increased separation and isolation between electrical signals and optical signals. There is also a need to develop these new signal routing technologies with a process that will have a reduced effect on the operation parameters of conventional bipolar and CMOS devices.

BRIEF SUMMARY OF THE INVENTION

The present relates to signal distribution by using subterranean distribution of optical signals on integrated circuits that include electronic semiconductor devices.

One embodiment of the present invention is a semiconductor device comprising a multi-layer substrate including a surface layer and a subterranean layer. The semiconductor device further includes a plurality of electrical devices formed in the surface layer and a plurality of subterranean optoelectronic devices formed in the subterranean layer. Also included is at least one optical waveguide formed in the subterranean layer and configured for transmitting an optical signal. The electrical devices are configured for receiving electrical signals, generating electrical signals, or combination thereof. The plurality of subterranean optoelectronic devices are configured for converting electrical signals to optical signals or converting optical signals to electrical signals. The semiconductor device further includes at least one electrical via formed in at least one of the surface layer and the subterranean layer and configured for coupling electrical signals between the subterranean layer and the surface layer.

Another embodiment of the present invention is also a semiconductor device comprising a multi-layer substrate including a surface layer and a subterranean layer. The semiconductor device further includes a plurality of electrical devices formed in the surface layer and a plurality of surface optoelectronic devices formed in the surface layer. Also included is at least one optical waveguide formed in the subterranean layer and configured for transmitting an optical signal. The electrical devices are configured for receiving electrical signal, generating electrical signals, or combination thereof. The plurality of surface optoelectronic devices are configured for converting electrical signals to optical signals or converting optical signals to electrical signals. The semiconductor device further includes at least one optical via formed in the at least one of the surface layer and the subterranean layer and configured for coupling optical signals between the subterranean layer and the surface layer.

Yet another embodiment of the present invention comprises a method of routing signals on a semiconductor device. The method includes directing an electrical signal from an electrical device located in a surface layer of the semiconductor device to a photo-generator located in the semiconductor device. The method further includes converting the electrical signal to an optical signal with the photo-generator. The method further includes routing the optical signal through at least a portion of a subterranean layer of the semiconductor device and converting the optical signal to an additional electrical signal with a photo-detector located in the semiconductor device.

The features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

Figure 1:
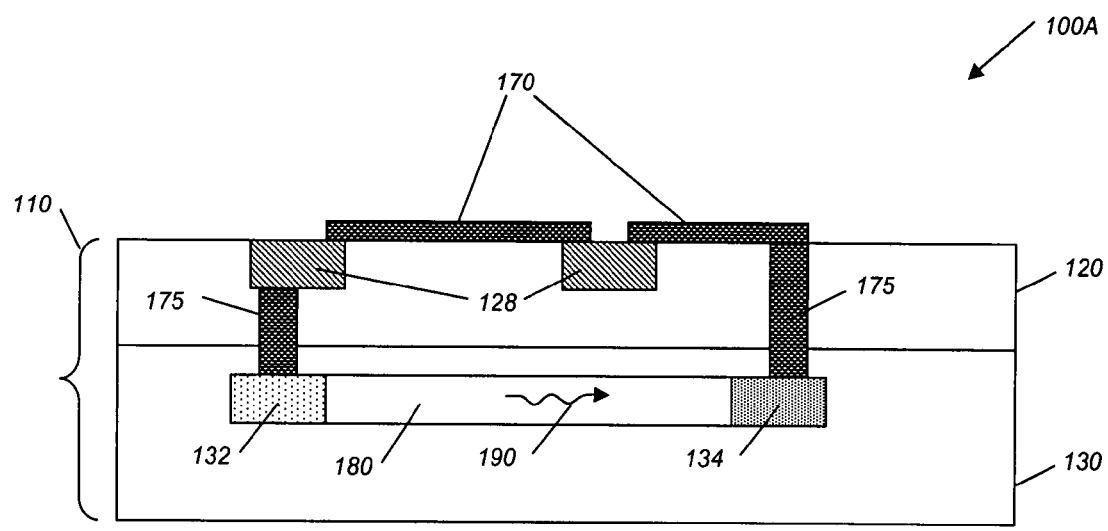
FIG. 1 is a cross section view of a portion of a semiconductor device showing optical waveguides in a subterranean layer and a surface layer formed on the subterranean layer according to an embodiment of the invention.

The present invention relates to signal distribution by using subterranean distribution of optical signals on integrated circuits that include electrical semiconductor devices.

The illustrations presented herein are not meant to be actual views of any particular semiconductor device, but are merely idealized representations which are employed to describe the present invention. Additionally, elements common between figures may retain the same numerical designation.

Representative embodiments of the present invention may include a variety of device types. Each of these device types may perform many different functions. As examples, and not limitations, some of the functions are enumerated for each of the device types.

Electrical devices (also referred to as electrical components) may be included in representative embodiments as active components suitable for fabrication on a semiconductor wafer, such as, for example, diodes, bipolar transistors, field effect transistors (FET), and metal-oxide semiconductor (MOS) transistors and other MOS devices. In addition, electrical components may be passive components, such as for example, resistors, inductors, and capacitors.

Optical devices may be devices suitable for fabrication on a semiconductor wafer and configured for manipulating optical signals, such as, for example, modulators, multiplexers, amplifiers, and beam-splitters. In various embodiments, the optical devices may be formed in silicon as a surface layer, in III-V semiconductor material as a subterranean layer, or combinations thereof.

Optoelectronic devices may be devices suitable for fabrication on a semiconductor wafer. Optoelectronic devices include photo-generator devices, which may be configured for converting electrical signals to optical signals, such as, for example, lasers and light emitting diodes. In addition, optoelectronic devices include photo-detector devices configured for converting optical signals to electrical signals, such as, for example broad spectrum photo-detectors and photo-detectors configured for detecting a narrow spectrum of optical wavelengths. In various embodiments, the optoelectronic devices may be formed in silicon as a surface layer, in III-V semiconductor material as a subterranean layer, or combinations thereof.

Representative embodiments of the present invention comprise a semiconductor device as a multi-layer substrate, which includes a surface layer and a subterranean layer. Depending on the embodiment, it may be desirable to configure the optical devices and optoelectronic devices in the subterranean layer, the surface layer, or combinations thereof. In embodiments of the present invention, optical signals are conveyed in optical waveguides formed in the subterranean layer.

These optical waveguides may be formed in a variety of ways in the subterranean layer. By way of example and not limitation, the optical waveguides may be formed as channels in the substrate, or as two-dimensional photonic crystal material wherein the waveguide is formed as a line of defects in the photonic crystal.

FIG. 1 illustrates a semiconductor device 100A according to a representative embodiment of the present invention including a multi-layer substrate 110, which includes a surface layer 120 and a subterranean layer 130. Included within the subterranean layer 130, a subterranean photo-generator 132 may generate an optical signal 190, which is transmitted via an optical waveguide 180 to a subterranean photo-detector 134. The semiconductor device 100A also includes electrical devices 128, which may be connected together with electrical traces 170 formed on the surface of the surface layer 120, or on embedded layers (not shown) within the surface layer 120. The subterranean optoelectronic devices (132 and 134) may be connected to the electrical devices 128 with electrical vias 175 extending from an electrical device 128 in the surface layer 120 through a portion of the surface layer 120 and through a portion of the subterranean layer 130 to couple with an optoelectronic device in the subterranean layer 130. In the FIG. 1 embodiment, the surface layer 120 may be formed on the subterranean layer 130 with a process such as epitaxial growth, which is explained more fully below.

Figure 2:
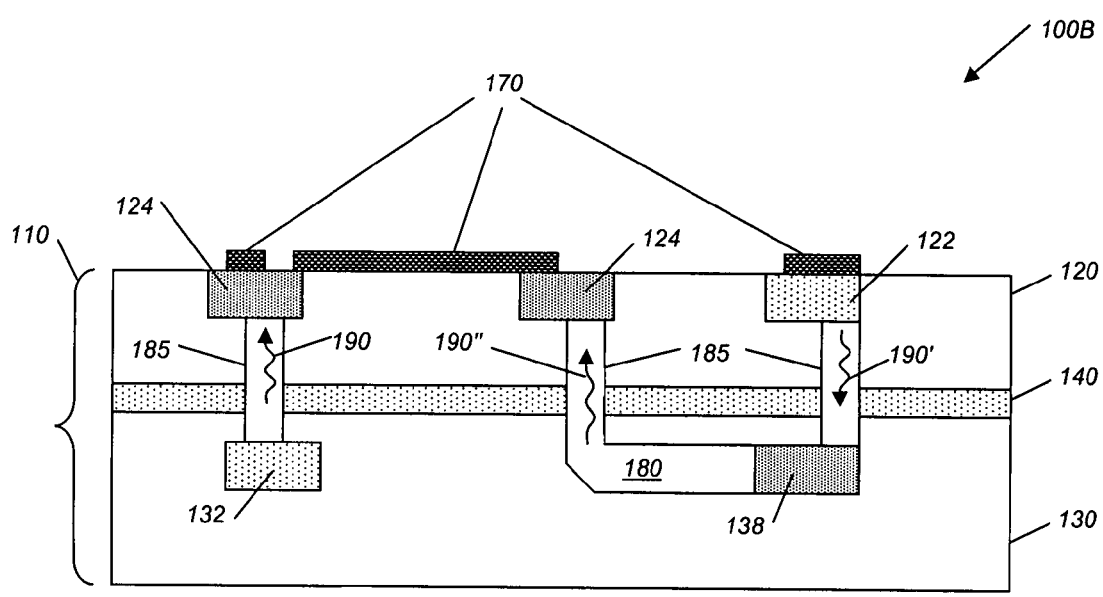
FIG. 2 is a cross section view of a portion of a semiconductor device showing optical waveguides in a subterranean layer and a surface layer formed on the subterranean layer with an intermediate layer formed between the subterranean layer and the surface layer according to an embodiment of the invention.

FIG. 2 illustrates a semiconductor device 100B according to another representative embodiment of the present invention including a multi-layer substrate 110, which includes a surface layer 120 and a subterranean layer 130. In this embodiment, an intermediate layer 140 may be formed between the subterranean layer 130 and the surface layer 120. The intermediate layer 140 is explained more fully below in the discussion of heteroepitaxy. As with the embodiment of FIG. 1, included within the subterranean layer 130 is an optical waveguide 180 configured for carrying optical signals 190. However, rather than using electrical vias, the FIG. 2 embodiment includes optical vias 185 extending through a portion of the surface layer 120 and through a portion of the subterranean layer 130 to carry optical signals 190 between devices in the surface layer 120 and devices in the subterranean layer 130. To generate and receive an optical signal 190, surface optoelectronic devices (122 and 124) may be formed in the surface layer 120. Thus, in the representative embodiment of FIG. 2, a subterranean photo-generator 132 emits an optical signal 190, which is conveyed through an optical via 185 to a surface photo-detector 124. Similarly, a surface photo-generator 122 may emit a second optical signal 190', which is conveyed through an optical via 185 to a subterranean optical device 138. The subterranean optical device may modify the second optical signal 190' to generate a third optical signal 190", which is carried by an optical waveguide 180 coupled to an optical via 185 back to a surface photo-detector 124. The surface photo-detector 124 and surface photo-generator 122 may be coupled to other electrical devices 128 (not shown), or other surface optoelectronic devices (122 and 124).

Figure 3:
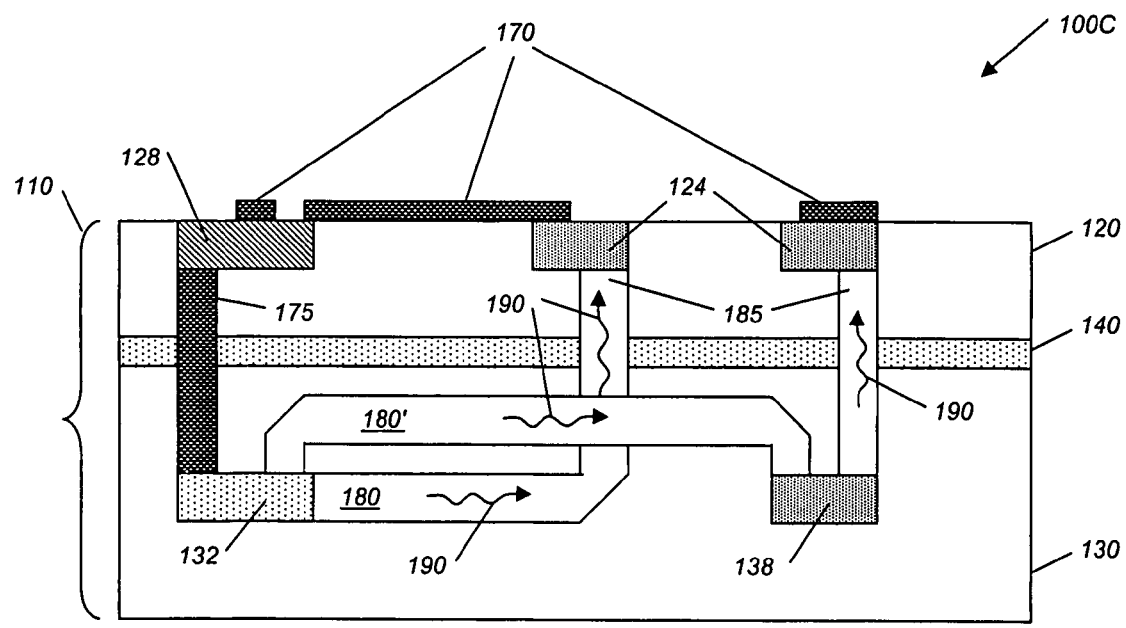
FIG. 3 is a cross section view of a portion of a semiconductor device showing multiple layers of optical waveguides in a subterranean layer and a surface layer formed on the subterranean layer according to an embodiment of the invention.

FIG. 3 illustrates a semiconductor device 100C according to another representative embodiment of the present invention. The embodiment illustrated in FIG. 3 is an expansion of the embodiment shown in FIG. 2 and further illustrates optical waveguides (180 and 180') that may be formed on multiple layers of the subterranean layer 130. The illustrated subterranean photo-generator 132 includes two optical outputs and an input coupled to an electrical device 128 through an electrical via 175. One optical output is coupled to a surface photo-detector 124 by an optical waveguide 180 and an optical via 185. The other optical output is coupled to an optical device 138 by another optical waveguide 180' on a different subterranean layer. The optical device 138 may be, for example, and not limitation, a multiplexer with an optical output coupled to a surface photo-detector 124 through an optical via 185. Another optical via 185 carries the output optical signal 190 from the optical device 138 to another surface photo-detector 124. In addition, the surface photo-detectors 124 may be coupled to electrical devices 128 with electrical traces 170.

It will be readily apparent to those of ordinary skill in the art that many other configurations of electrical devices 128, optoelectronic devices (122, 124, 132, and 134), and optical devices 138, coupled by electrical traces 170, electrical vias 175, optical waveguides 180, and optical vias 185 are contemplated as being within the scope of the present invention. Furthermore, while not illustrated, those of ordinary skill in the art will recognize that semiconductor devices (100A, 100B, and 100C) may be configured with optical devices 138 and optoelectronic devices (132, and 134) on one or more subterranean layers, and optical waveguides 180 configured on one or more subterranean layers different from the subterranean layers containing optical devices 138 and optoelectronic devices (132, and 134).

Of course, the representative embodiments illustrated in FIGS. 1, 2, and 3 are used to illustrate possible connections. It will be readily apparent to those of ordinary skill in the art that any of the coupling scenarios illustrated in FIGS. 1, 2, and 3 may be implemented in large numbers and various combinations.

In the embodiments, of FIGS. 1, 2, and 3, the surface layer 120 may be formed on the subterranean layer 130 with a heteroepitaxy growth process. Heteroepitaxy is a method of forming one type of material on a different type of material. In heteroepitaxy, a crystalline film of one material is formed through a deposition or growth process on a crystalline substrate of another material.

For example, and not limitation, in Molecular Beam Epitaxy (MBE), it may be possible to form a perfect crystal, or near perfect crystal, by depositing one or more pure materials, one layer of atoms at a time, under high vacuum, onto a single crystal wafer. A common MBE process includes starting with a silicon material and growing a III-V material such as gallium arsenide using ultra-pure elements of gallium and arsenic, which are heated in separate furnaces until they each slowly begin to evaporate. The evaporated elements condense on the wafer, where they react with each other, forming the gallium arsenide. The term "beam" in this case simply means that evaporated atoms do not meet each other or any other gases until they reach the wafer. With this process, every atom reaching the surface of the heated substrate has enough time to migrate on the surface to a location suitable for building the new crystal lattice.

Many III-V materials may be useful in representative embodiments of the present invention. By way of example, and not limitation, some of these materials include gallium arsenide (GaAs), gallium indium arsenide (GaInAs), gallium aluminum arsenide (GaAs), indium phosphide (InP), cadmium sulfide (CdS), and the like.

While not as common, heteroepitaxy may start with a III-V material wafer as the subterranean layer 130. Then, a heteroepitaxy process may be used to grow a silicon material to form a perfect crystal, or near perfect crystal of silicon for the formation of optoelectronic and electrical devices 128 in the surface layer 120. Purity of the grown silicon crystal may affect the performance and fabrication characteristics of devices formed in this surface layer 120, which may be one of the reasons that this configuration is less common. However, as stated earlier, optical waveguides 180 in a subterranean layer 130 may be desirable for a number of reasons, such as, for example only, to reduce interference between electrical signals and optical signals.

Some representative embodiments may include one or more intermediate layers 140 positioned between the subterranean layer 130 and the surface layer 120. An amorphous intermediate layer 140 may help to relieve strain between the subterranean layer 130 and the surface layer 120 due to mismatches in the lattice constants between the two layers. In some embodiments, a suitable template material also may be deposited on the subterranean layer 130 or amorphous intermediate layer 140. The template material, which may have a thickness of 1 to about 10 molecules, may be useful in providing sites for nucleation of the epitaxial growth of the surface layer 120.

For many cases, fabrication of optical devices, optical waveguides, and optoelectronic devices may be easier on III-V type materials. In addition, the performance of these devices may be better when fabricated with III-V material than with silicon. However, optoelectronic devices fabricated on silicon have been proposed, and silicon waveguides, particularly photonic crystal waveguides, may be fabricated. As a result, some embodiments of the present invention may include a silicon subterranean layer 130 with a homoepitaxy surface layer 120 grown to form a perfect crystal, or near perfect crystal, for the formation of optoelectronic devices and electrical devices in the surface layer 120.

In addition, for some applications, it may be desirable to have a template of waveguides in the subterranean layer 130 on which a variety of electrical devices, or functional blocks may be formed. This configuration may create a generic subterranean layer 130 for routing high speed signals, such as, for example clock signals. Thus, a variety of functional devices may then be developed with electronic devices and optoelectronic devices forming various functional blocks 200 in the surface layer 120.

Figure 4:
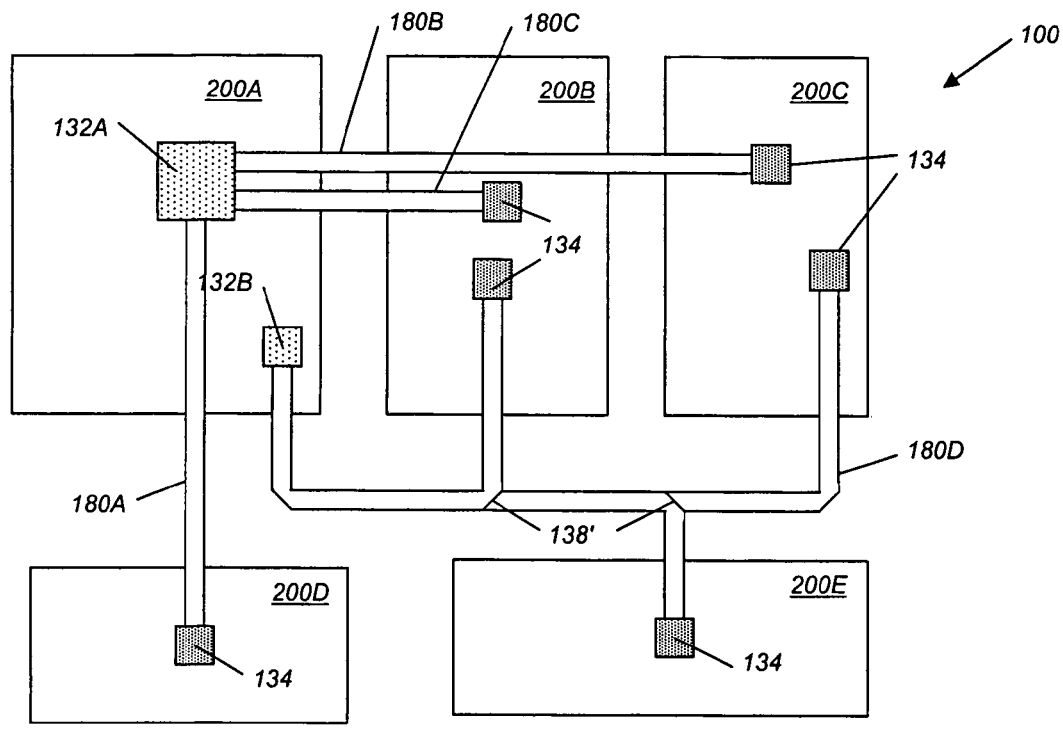
FIG. 4 is a plan view of a possible routing of optical signals between functional electronic blocks on a portion of a semiconductor device according to an embodiment of the invention.

FIG. 4 illustrates an example of such a configuration for a semiconductor device 100. In FIG. 4 a variety of functional blocks 200A-200E may be formed in the surface layer. These functional blocks 200A-200E may have some of the signals coupling the functional blocks 200A-200E configured as optical waveguides 180 routed in the subterranean layer.

In this embodiment, functional block 200A includes two subterranean photo-generators (132A and 132B). The first subterranean photo-generator 132A is coupled, using optical waveguides 180, to subterranean photo-detectors 134 located in functional blocks 200B, 200C, and 200D. This coupling illustrates a point-to-point type connection that may be desirable for more signal quality in some optical signals.

The second subterranean photo-generator 132B couples to subterranean photo-detectors 134 in functional blocks 200B, 200C, and 200E. This coupling illustrates a trunk and limb type routing. To accomplish this type of routing using optical signals, it may be useful to position beam-splitters 138' at the branches. The beam-splitters 138' are configured to reflect a portion of the optical signal down the branch, and transmit another portion of the optical signal along the trunk.

Figure 5:
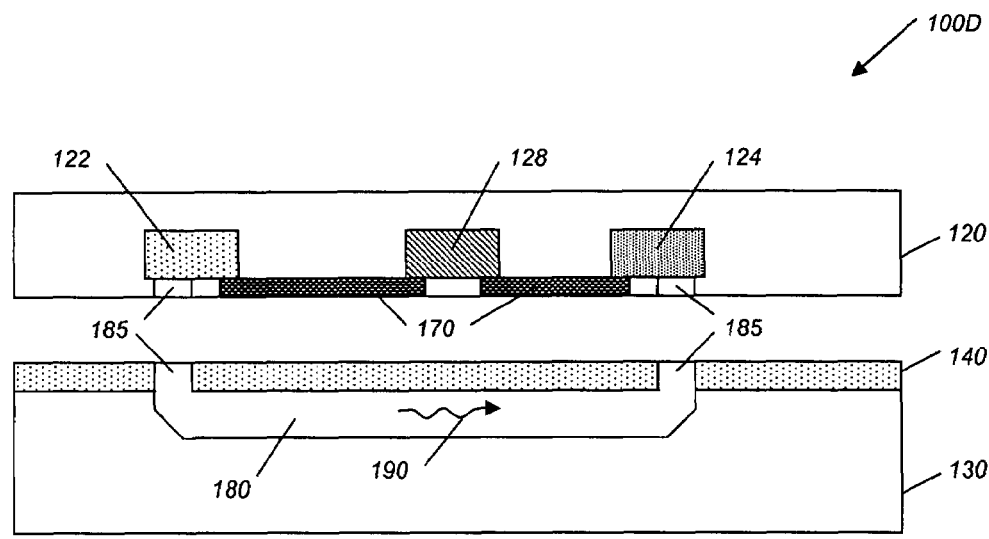
FIG. 5 is a cross section view of a portion of a semiconductor device configured as a surface layer and bearing optoelectronic devices, and a portion of another semiconductor device configured as a subterranean layer according to an embodiment of the invention.

Other representative embodiments of the present invention may be formed using wafer bonding, rather than epitaxial growth. FIG. 5 illustrates a semiconductor device 100D before wafer bonding. A subterranean layer 130, which may include an intermediate layer 140 formed above the subterranean layer 130, is shown in FIG. 5. Also, for conveying an optical signal 190, an optical waveguide 180 and optical vias 185 positioned at both ends of the optical waveguide 180 are formed in the subterranean layer 130.

A surface layer is also shown in FIG. 5. This surface layer 120 is shown inverted from the conventional depiction. As a result rather than being shown on top, electrical traces 170 are shown on the lower surface and optical vias 185 are shown extending from devices in the surface layer 120 to the lower surface. The surface layer 120 includes an electrical device 128 coupled by electrical traces 170 to a surface photo-generator 122 and a surface photo-detector 124. Optical vias 185 in the surface layer 120 are also coupled to the surface photo-generator 122, and surface photo-detector 124.

Figure 6:
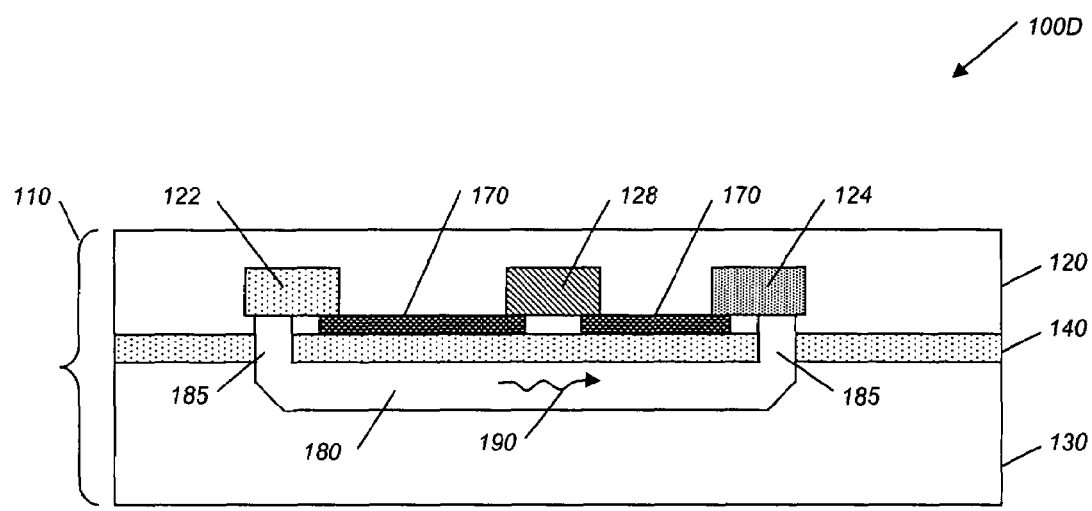
FIG. 6 illustrates the semiconductor devices of FIG. 5 bonded together.

FIG. 6 illustrates the semiconductor device 100D, comprising the subterranean layer 130, intermediate layer 140, and surface layer 120 of FIG. 5 after they have been bonded together with a wafer bonding process, which is explained more fully below. During wafer bonding, the optical vias 185 in the surface layer 120 are aligned with the optical vias 185 in the subterranean layer 130 so that a continuous optical waveguide, for conveying the optical signal 190, is formed between the surface photo-generator 122 and the surface photo-detector 124.

Figure 7:
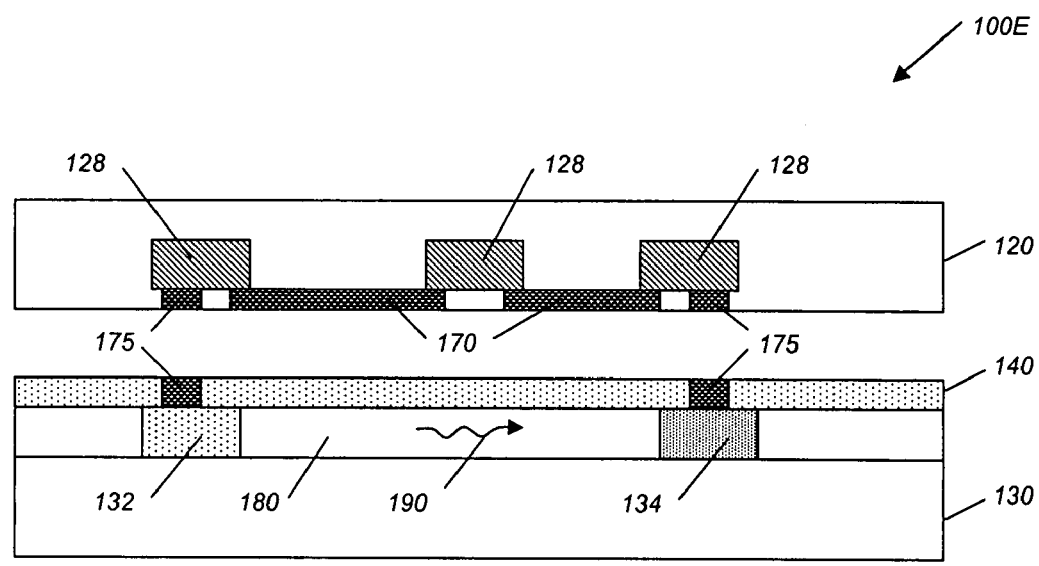
FIG. 7 is a cross section view of a portion of a semiconductor device configured as a surface layer, and a portion of another semiconductor device bearing optoelectronic devices and configured as a subterranean layer according to an embodiment of the invention.

FIG. 7 illustrates another representative embodiment of a semiconductor device 100E using wafer bonding. In FIG. 7, a subterranean layer 130 may include an intermediate layer 140 formed above the subterranean layer 130. Also, for conveying an optical signal 190, an optical waveguide 180 couples a subterranean photo-generator 132 and a subterranean photo-detector 134. Electrical vias 175 are formed to convey electrical signals to and from the subterranean optoelectronic devices (132 and 134).

The FIG. 7 embodiment also includes a surface layer 120, which is shown inverted from the conventional depiction. As a result, rather than shown on top, electrical traces 170 are shown on the lower surface and electrical vias 175 are shown extending from devices in the surface layer 120 to the lower surface. The surface layer 120 includes electrical devices 128 coupled by electrical traces 170 to each other while some of the electrical devices 128 are coupled to electrical vias 175.

Figure 8:
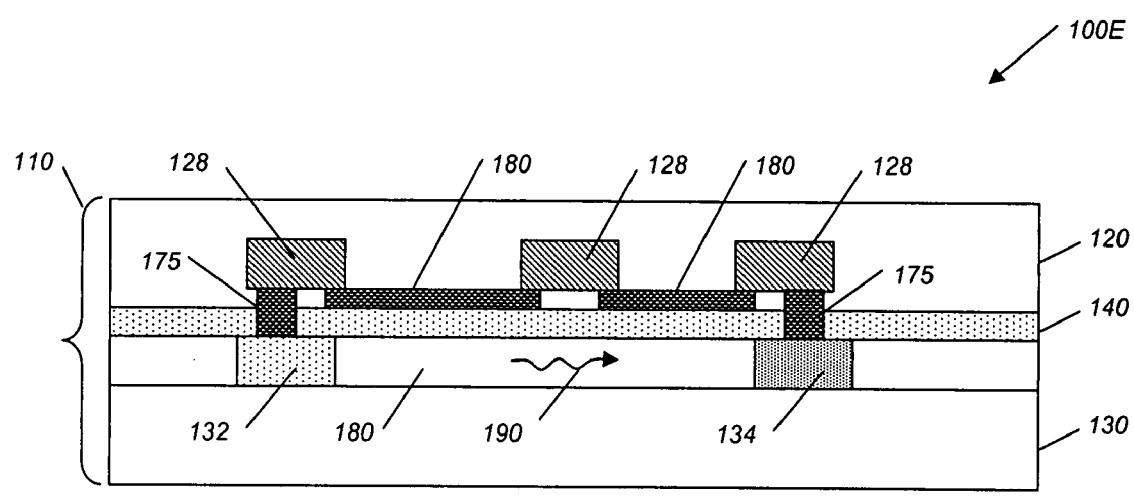
FIG. 8 illustrates the semiconductor devices of FIG. 7 bonded together.

FIG. 8 illustrates the semiconductor device 100E, comprising the subterranean layer 130, intermediate layer 140, and surface layer 120 of FIG. 7 after they have been bonded together with a wafer bonding process, which is explained more fully below. During wafer bonding, the electrical vias 175 in the surface layer 120 are aligned with the electrical vias 175 in the subterranean layer 130 so that an electrical connection is formed between the surface electrical devices 128 and the subterranean optoelectronic devices (132 and 134).

It will be readily apparent to those of ordinary skill in the art that many other configurations of electrical devices 128, optoelectronic devices (122, 124, 132, and 134), and optical devices 138, coupled by electrical traces 170, electrical vias 175, optical waveguides 180, and optical vias 185 are contemplated as within the scope of the present invention as illustrated in the representative embodiments of FIGS. 5-8. Furthermore, while not illustrated, those of ordinary skill in the art will recognize that semiconductor devices (100D and 100E) may be configured with optical devices 138 and optoelectronic devices (132, and 134) on one or more subterranean layers, and optical waveguides 180 may be configured on one or more subterranean layers different from the subterranean layers containing optical devices 138 and optoelectronic devices (132, and 134).

Of course, the representative embodiments illustrated in FIGS. 5-8 are used to illustrate possible connections. It will be readily apparent to those of ordinary skill in the art that any of the coupling scenarios illustrated in FIGS. 1-3, as well as those illustrated in FIGS. 5-8, may be implemented in large numbers and various combinations.

In the representative embodiments shown in FIGS. 5-8, wafer bonding is the process used to combine layers of dissimilar materials, such as silicon to glass, and silicon to III-V material. Or, it may be desired to bond wafers of similar material, such as silicon, wherein optoelectronic devices are fabricate on one silicon wafer and electronic devices are fabricated on the other silicon wafer.

Various wafer bonding processes have been developed for bonding one wafer to another wafer. Some of the most common techniques include fusion bonding, eutectic bonding, anodic bonding and intermediary layer bonding. In these bonding processes a significant aspect of the process is to ensure that the surfaces of the wafers are planarized to reduce surface imperfections and ensure flat, clean surfaces for bonding. In addition, via holes may need to be formed to connect to electrical devices, optical devices, or optoelectronic devices. Via holes intended as electrical vias are then filled with an electrically conductive material.

In fusion bonding, wafers comprised of similar materials are held together, possibly under pressure, and the wafers are heated until the mated surfaces of the two wafers fuse together. Eutectic bonding is similar to fusion bonding except generally the two wafers comprise different materials. As a result, as the two wafers are heated an alloy of the two materials may form at the junction.

In anodic bonding, two wafers are mated together and a high voltage is applied across the interface between the two wafers. The high voltage may cause ion migration across the interface. As a result, opposing space charges on the two surfaces hold the surfaces together with electrostatic forces.

As illustrated in FIGS. 5-8, some wafer bonding process use an intermediary layer 140. The intermediate layer 140 may help by acting as an adhesive holding the two wafers together. While not shown in the FIGS. 5-8, many wafer bonding processes may not require this intermediate layer 140, and embodiments without an intermediate layer 140 are encompassed by the scope of the invention.

Although the foregoing description contains many specifics, these are not to be construed as limiting the scope of the present invention, but merely as providing certain exemplary embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A semiconductor device, comprising:
a multi-layer substrate comprising a surface layer and a subterranean layer;
at least one optical waveguide formed within the subterranean layer and configured for transmitting an optical signal;
a plurality of electrical devices formed within the surface layer, each electrical device configured for receiving electrical signals, generating electrical signals, or a combination thereof;
a plurality of optoelectronic devices formed within the surface and/or subterranean layer, each optoelectronic device configured for converting an electrical signal to an optical signal or converting an optical signal to an electrical signal; and
at least one via formed for coupling electrical signals and/or optical signals between the subterranean layer and the surface layer, the at least one via being an electrical via or an optical via;
said waveguide, optoelectronic devices and vias being arranged so as to communicate a data signal from one of said plurality of electrical devices in said surface layer to another of said plurality of electrical devices in said surface layer.

2. The semiconductor device of claim 1, further comprising an intermediate layer disposed between the surface layer and the subterranean layer wherein the at least one via comprises an electrical via that extends through the intermediate layer.

3. The semiconductor device of claim 1, wherein:
the plurality of optoelectronic devices comprises a plurality of surface optoelectronic devices formed in the surface layer, each surface optoelectronic device configured for converting an electrical signal to an optical signal or converting an optical signal to an electrical signal; and
the at least one via comprises at least one optical via formed in at least one of the surface layer and the subterranean layer and configured for coupling optical signals between the subterranean layer and the surface layer.

4. The semiconductor device of claim 3, further comprising an intermediate layer disposed between the surface layer and the subterranean layer wherein the at least one electrical via and the at least one optical via extend through the intermediate layer.

5. The semiconductor device of claim 3, wherein the plurality of surface optoelectronic devices are selected from the group consisting of photo-generators and photo-detectors.

6. The semiconductor device of claim 1, wherein the plurality of subterranean optoelectronic devices are selected from the group consisting of photo-generators and photo-detectors.

7. The semiconductor device of claim 1, further comprising at least one optical device operably coupled to the at least one optical waveguide, the at least one optical device selected from the group consisting of modulators, multiplexers, amplifiers, and beam-splitters.

8. The semiconductor device of claim 1, wherein the subterranean layer comprises a photonic crystal, the at least one optical waveguide being formed by a line of defects in said photonic crystal in the subterranean layer.

9. The semiconductor device of claim 1, wherein the at least one waveguide comprises a trunk and branches, with at least one beam-splitter being located so as to optically couple an optical signal between said trunk and a said branch of the at least one wave guide.

10. The semiconductor device of claim 1, wherein the surface layer comprises a silicon wafer bonded to a III-V material wafer including the subterranean layer.

11. The semiconductor device of claim 1, wherein the surface layer comprises a silicon wafer bonded to another silicon wafer including the subterranean layer.

12. The semiconductor device of claim 1, further comprising an intermediate layer disposed between the surface layer and the subterranean layer wherein the at least one via comprises at least one optical via that extends through the intermediate layer.

13. The semiconductor device of claim 1, wherein:
the plurality of optoelectronic devices comprises a plurality of subterranean optoelectronic devices formed within the subterranean layer, each subterranean optoelectronic device configured for converting an electrical signal to an optical signal or converting an optical signal to an electrical signal; and
the at least one via comprises at least one electrical via formed within at least one of the surface layer and the subterranean layer and configured for coupling electrical signals between the subterranean layer and the surface layer.

14. The semiconductor device of claim 13, further comprising an intermediate layer disposed between the surface layer and the subterranean layer wherein the at least one electrical via and the at least one optical via extend through the intermediate layer.

15. The semiconductor device of claim 1, wherein the plurality of optoelectronic devices are selected from the group consisting of photo-generators and photo-detectors.

16. A method of routing signals on a semiconductor device, comprising:
routing an electrical signal from an electrical device located in a surface layer of a multi-layer substrate of the semiconductor device to at least one photo-generator located in the multi-layer substrate;
converting the electrical signal to an optical signal with the at least one photo-generator;
directing the optical signal through a line of defects in a photonic crystal material in at least a portion of a subterranean layer of the multi-layer substrate to at least one photo-detector; and
converting the optical signal to an additional electrical signal with the at least one photo-detector located in the multi-layer substrate.

17. The method of claim 16, further comprising directing the additional electrical signal from the photo-detector to an additional electrical device located within the surface layer.

18. A semiconductor device, comprising:
a multi-layer substrate comprising a surface layer and a subterranean layer;
at least one optical waveguide formed within the subterranean layer and configured for transmitting an optical signal;
a plurality of electrical devices formed within the surface layer above said optical waveguide, each electrical device configured for receiving electrical signals, generating electrical signals, or a combination thereof;
a plurality of optoelectronic devices in electrical communication with said plurality of electrical devices, in optical communication with said optical waveguide, and configured for converting an electrical signal to an optical signal or converting an optical signal to an electrical signal; and at least one via for coupling electrical signals and/or optical signals between the subterranean layer and the surface layer, the at least one via being an electrical via or an optical via.

19. The semiconductor device of claim 18, wherein said waveguide comprises a line of defects in photonic crystal.

20. The semiconductor device of claim 18, wherein said waveguide comprises a trunk and branches with optical beam-splitters positioned at said branches.

* * * * *